United States Patent
Day et al.

(10) Patent No.: US 6,948,553 B1
(45) Date of Patent: Sep. 27, 2005

(54) MODULAR HEAT RECOVERY VENTILATION SYSTEM

(75) Inventors: Michael Sean Day, Sacramento, CA (US); Calvin Richard Wylie, Roseville, CA (US); Tristan Adair Venzke, Orangevale, CA (US)

(73) Assignee: Beutler Corporation, McClellan, CA (US)

( * ) Notice: Subject to any disclaimer, the term of this patent is extended or adjusted under 35 U.S.C. 154(b) by 272 days.

(21) Appl. No.: 10/268,414

(22) Filed: Oct. 9, 2002

(51) Int. Cl.[7] .............................. F24F 7/06; F24F 7/007
(52) U.S. Cl. .......................... 165/54; 165/72; 165/122; 454/249; 454/251
(58) Field of Search .............................. 165/54, 58, 42, 165/59, 43, 48.2, 120, 122, 72; 454/229, 454/236, 238, 148, 251, 228, 233, 234, 249

(56) References Cited

U.S. PATENT DOCUMENTS

| | | | |
|---|---|---|---|
| 1,002,308 A * | 9/1911 | Powers ......................... | 454/229 |
| 1,019,818 A * | 3/1912 | McMurdie ................... | 454/251 |
| RE26,183 E * | 4/1967 | Morrell ........................ | 454/251 |
| 3,766,844 A * | 10/1973 | Donnelly et al. ............ | 454/238 |
| 4,597,323 A * | 7/1986 | Mordau et al. .............. | 454/148 |
| 4,633,768 A * | 1/1987 | Benson ......................... | 454/236 |
| 4,993,484 A * | 2/1991 | Neuzil .......................... | 165/54 |
| 5,014,770 A * | 5/1991 | Palmer ........................ | 165/48.2 |
| 5,924,300 A * | 7/1999 | Fromm et al. ............... | 165/122 |
| 5,966,773 A * | 10/1999 | Jones ............................ | 15/304 |
| 6,083,300 A * | 7/2000 | McFadden .................... | 95/113 |
| 6,101,828 A * | 8/2000 | Shikata et al. ................ | 165/42 |
| 6,155,074 A * | 12/2000 | Jung et al. ..................... | 62/498 |
| 6,257,012 B1 * | 7/2001 | Tesche et al. ................. | 62/298 |
| 6,406,522 B1 * | 6/2002 | McFadden et al. ........... | 95/113 |
| 6,789,607 B1 * | 9/2004 | Jun et al. ....................... | 165/43 |

FOREIGN PATENT DOCUMENTS

GB          2095394 A  *  9/1982  ........... F24F 7/007

* cited by examiner

Primary Examiner—Ljiljana Ciric
(74) Attorney, Agent, or Firm—Thomas R. Lampe

(57) ABSTRACT

A modular heat recovery ventilation system includes a modular heat exchanger and a modular apparatus spaced from the heat exchanger for delivering both fresh air and exhaust air to the heat exchanger. The apparatus includes separate blowers for generating two separate air streams. The apparatus includes an access plate at the bottom thereof allowing access to the interior of the enclosure of the apparatus through a ceiling.

11 Claims, 3 Drawing Sheets

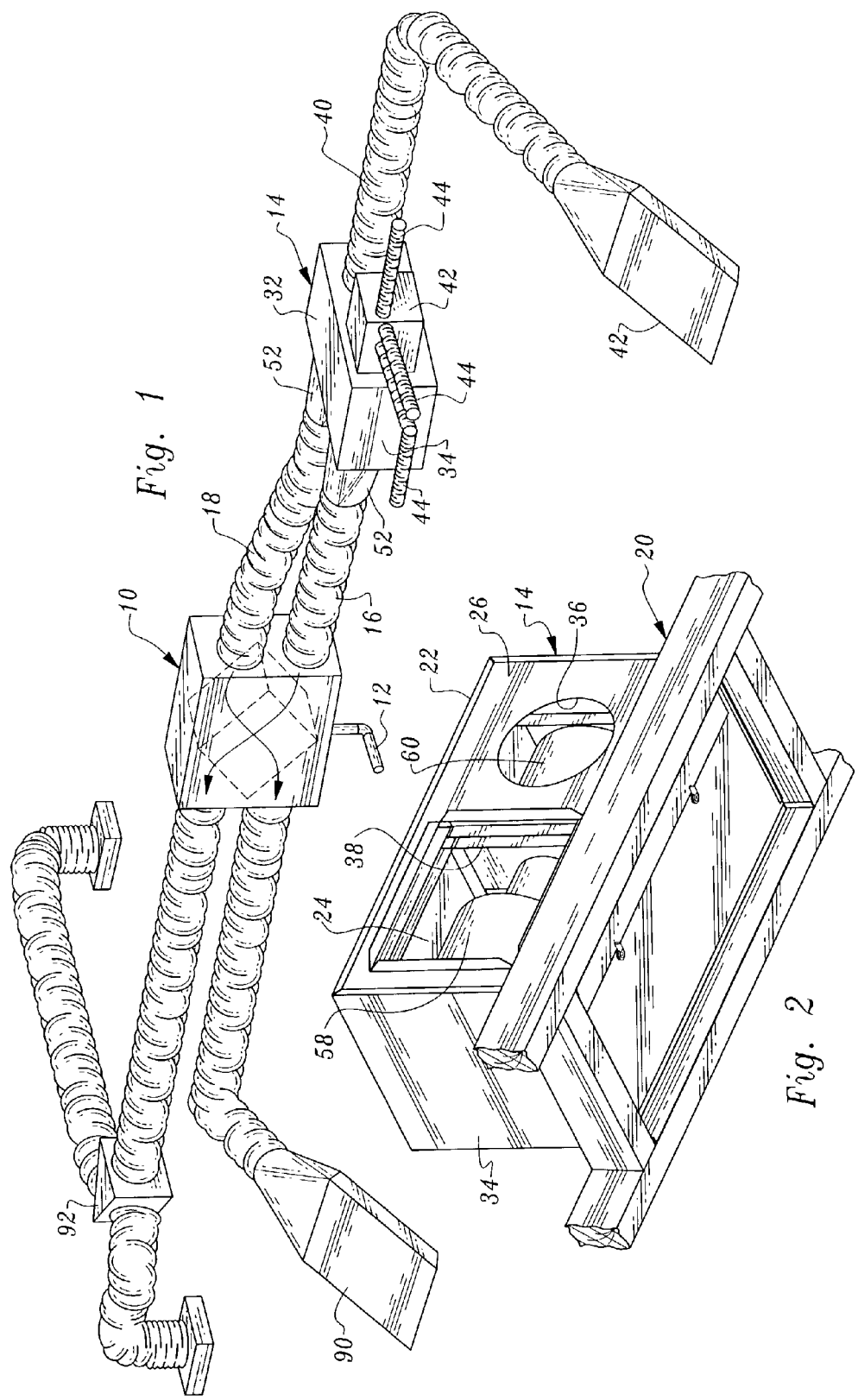

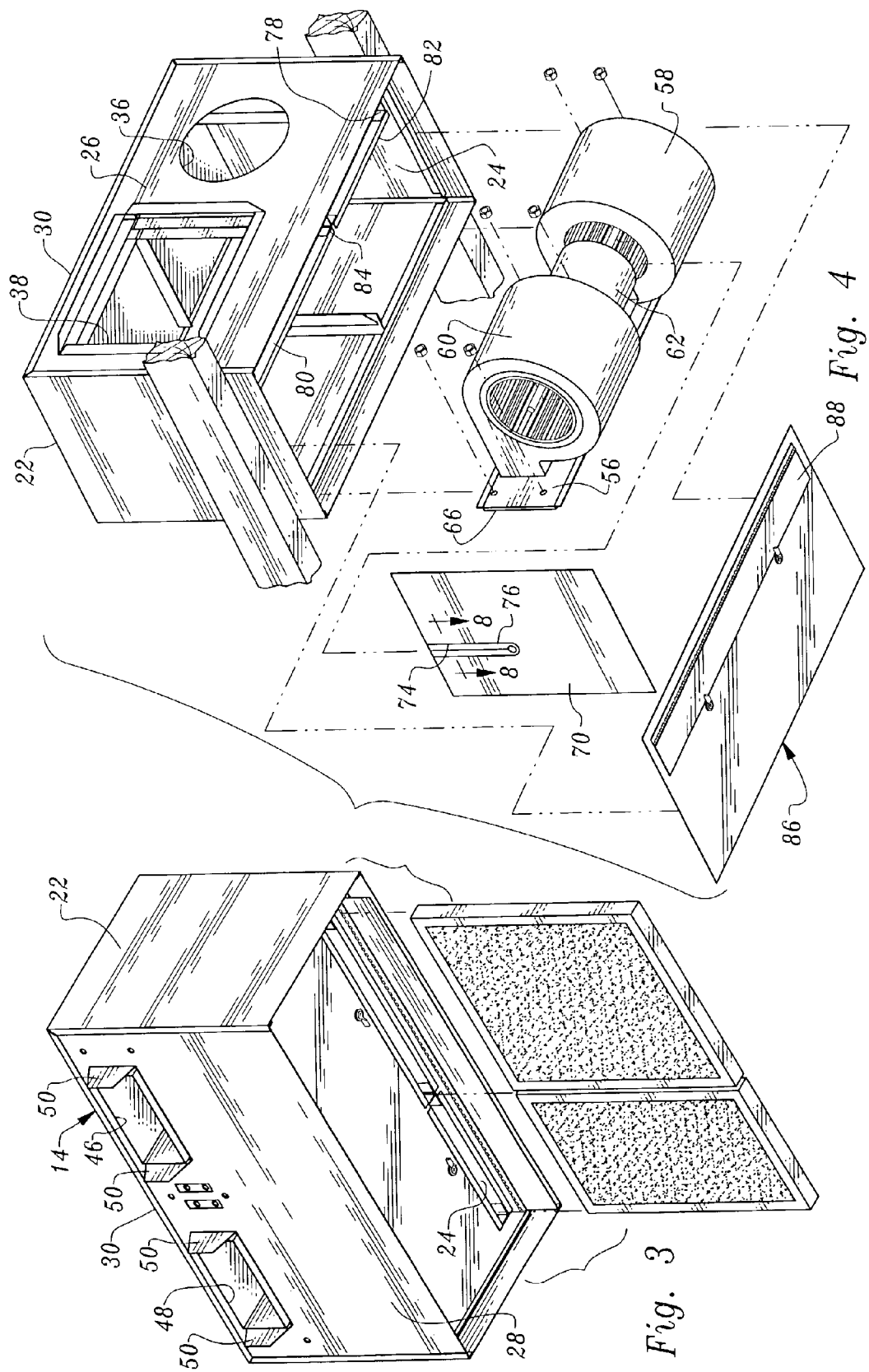

MODULAR HEAT RECOVERY VENTILATION SYSTEM

TECHNICAL FIELD

This invention relates to a system utilized to supply fresh air to the interior of a house or other building while at the same time exhausting stale air from the building. The exhaust air travels to a heat exchanger to either preheat or pre-cool the incoming supply air.

BACKGROUND OF THE INVENTION

The use of heat exchangers in residences and other buildings is well known. Typically heat exchangers employed in houses and other buildings incorporate a fan which causes air to flow through the exchanger. Because heat exchangers require draining of condensate produced thereby, there are limitations and restrictions as to where heat exchangers can be located. A location where a heat exchanger can be installed does not always lend itself to servicing of the fan related and other components associated with the heat exchanger. Furthermore, replacement of filters employed in association with a conventional heat exchanger arrangement can be a difficult and time consuming task.

DISCLOSURE OF INVENTION

The present invention relates to a system which incorporates two separate modular appliances, apparatus in the nature of a fan box and a heat exchanger. This two-part arrangement allows mounting of the apparatus at a location that allows ready access to filters and apparatus components from within the living space of a home, while allowing the heat exchanger to be placed in a separate location that is convenient for the routing of a condensate drain, etc.

The system disclosed and claimed herein is characterized by its relative simplicity, relatively low cost and ease of use and maintenance. Utilizing the principles of the present invention, an individual can access and change filters associated with the apparatus from inside the living quarters of a home, despite the fact that the apparatus itself may be positioned in the attic. Furthermore, there is also ease of access to the interior of the enclosure of the apparatus so that a unitary blower assembly disposed therein can be removed from inside the enclosure for repair, servicing or replacement.

The system of the present invention includes the combination of a heat exchanger and apparatus for causing air flow of both fresh supply air and stale exhaust air to the heat exchanger to either pre-heat or pre-cool the supply air.

The apparatus is of modular construction and spaced from the heat exchanger.

The apparatus includes an enclosure defining an enclosure interior, the enclosure including an inlet portion having a supply air inlet opening and an exhaust air inlet opening. The enclosure further includes an outlet portion having a supply air outlet opening and an exhaust air outlet opening.

A blower assembly is releasably connected by connector structure to the enclosure with the blower assembly disposed in the enclosure interior.

The blower assembly is in fluid flow communication with the supply air inlet opening, the exhaust air inlet opening, the supply air outlet opening, the exhaust air outlet opening and the housing interior.

Air flow of fresh supply air caused by the blower assembly passes seriatim through the supply air inlet opening, the housing interior and the supply air outlet opening and is delivered to the heat exchanger.

Air flow of exhaust air caused by the blower assembly passes seriatim through the exhaust air inlet opening, the housing interior and the exhaust air outlet opening and is delivered to the heat exchanger to employ the exhaust air to either pre-heat or pre-cool the fresh supply air at the heat exchanger.

Other features, advantages and objects of the present invention will become apparent with reference to the following description and accompanying drawings.

BRIEF DESCRIPTION OF DRAWINGS

FIG. 1 shows a system incorporating the teachings of the present invention, including a heat exchanger and apparatus for causing air flow to the heat exchanger;

FIG. 2 is a perspective view of the apparatus for causing air flow to the heat exchanger mounted on and supported by a portion of the framing of the house, for example the bottom chord of a ceiling truss separating the living space of a house from the attic;

FIG. 3 illustrates the enclosure of the apparatus with an access door at the enclosure bottom open and in the process of receiving two air filters;

FIG. 4 is an exploded, perspective view illustrating selected components of the apparatus;

BEST MODE FOR CARRYING OUT THE INVENTION

Figure 5:
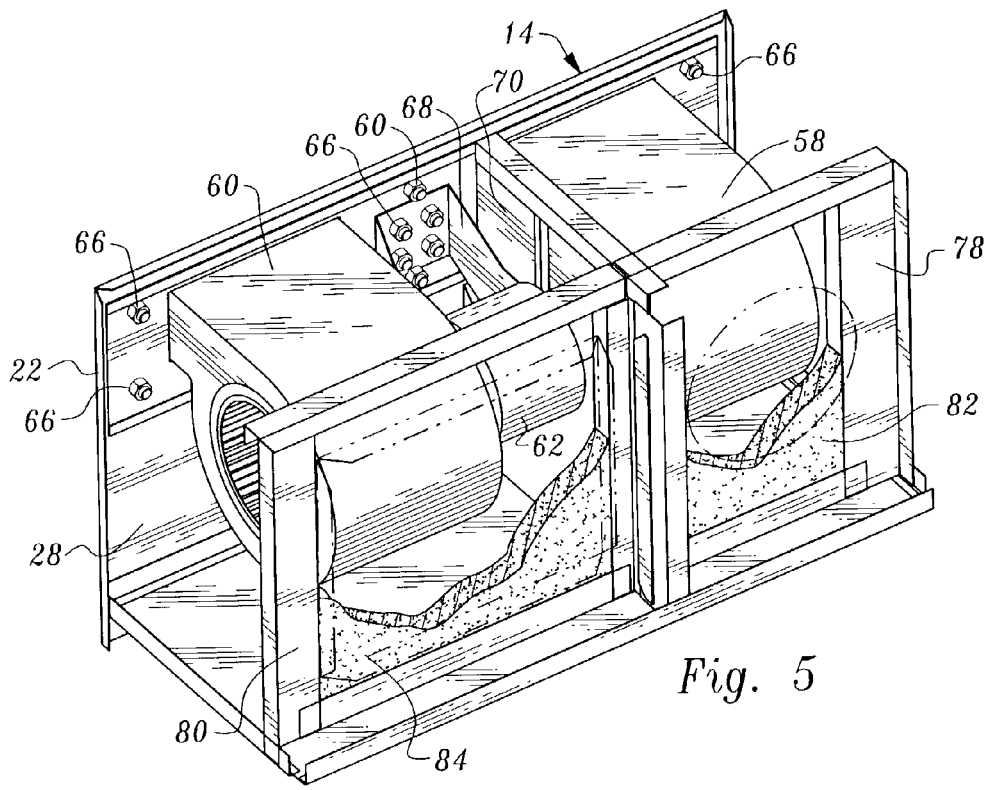
FIG. 5 is a perspective view illustrating the two air filters in position within an air filter holder of the apparatus and located on opposed sides of an air separator plate, the shell and inlet plate of the enclosure having been removed and portions of the air filters broken away to illustrate selected features of the apparatus.
Figure 6:
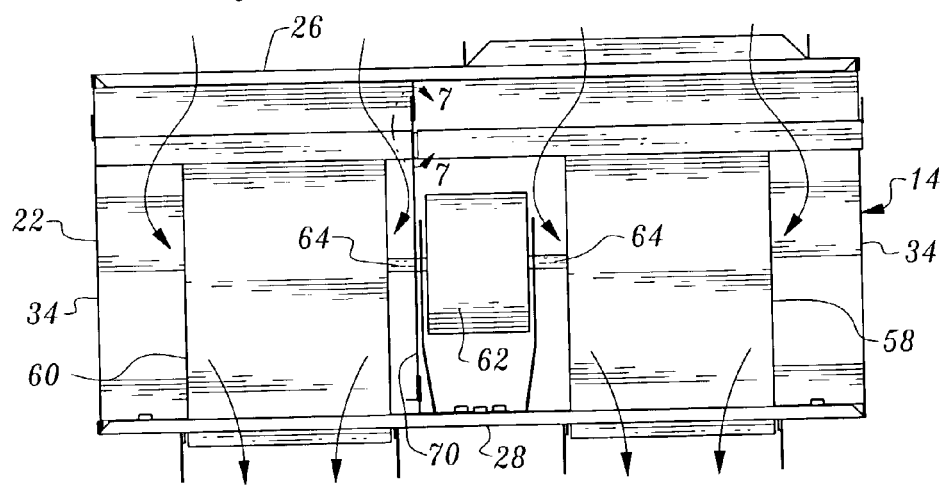
FIG. 6 is a schematic representation of flow of supply air and exhaust air through the apparatus during operation.

FIG. 1 illustrates a modular heat recovery ventilation system constructed in accordance with the teachings of the present invention. The system includes a heat exchanger 10 of any known suitable construction. A condensate drain 12 is associated with the heat exchanger. Operatively associated with the heat exchanger 10 and spaced therefrom is apparatus 14 which is in the general nature of a fan box. Ducts or conduits 16, 18 interconnect the apparatus 14 to the heat exchanger 10, these two appliances being spaced from one another and of modular construction. Thus, the positioning of the heat exchanger 10 in a house or other building does not dictate the location of apparatus 14 or vice versa.

FIG. 2 shows apparatus 14 mounted on framing of a house and more particularly on a bottom chord of a ceiling truss 20 located between an attic and the living space of a home. The apparatus 14 may be secured in position by any known expedient such as nails or threaded fasteners. As will be seen below, an important aspect of the invention is the ability to service the apparatus 14 from inside the living space of the house or other building.

Apparatus 14 includes an enclosure 22 having an enclosure interior 24. The enclosure includes an inlet plate 26, an outlet plate 28 and a shell 30, all of which are suitably formed from sheet metal. Machine screws or other suitable connectors may be utilized to secure the inlet plate, outlet plate and shell together to provide a stable structure.

The shell has a shell top 32 and two spaced shell sides 34 connected to and extending between the outlet plate and the inlet plate.

The system of the present invention is to supply fresh air into a home or other building while at the same time exhausting stale air from the home. The exhaust air travels to the heat exchanger 10 to either pre-heat or pre-cool the incoming supply air provided by the system.

The inlet plate 26 is where both the supply and exhaust air streams enter apparatus 14. The inlet plate has openings formed therein, namely, a supply air inlet opening 36 and an exhaust air inlet opening 38. A duct or conduit 40 and associated fresh air eave plenum 42 establish communication between the opening 36 and the ambient air outside the home. Exhaust air inlet opening 38 communicates with the interior of a plenum 42 having ducts 44 leading from multiple locations within the building.

Outlet plate 28 has a supply air outlet opening 46 and an exhaust air outlet opening 48 formed therein. Flanges 50 project outwardly from the outlet plate 28 at the sides of openings 46, 48 for the purpose of connecting sheet metal transitions 52 associated with ducts 16, 18 to the outlet plate by sheet metal screws. As will be seen below, blowers associated with the system have the outlets thereof positioned in openings 46, 48. It is important that the sheet metal transitions 52 be connected to the enclosure 22 and not directly to the housings of the blowers so that the blower assembly which will be described below, and of which the blowers are a part, can be removed in case of repair or replacement.

An important component of the apparatus 14 is a unitary blower assembly 54. Blower assembly 54 includes a base plate 56 and two blowers 58, 60, the outer housings of the blowers suitably being secured to the base plate by sheet metal screws. A motor 62 is disposed between the blowers 58, 60, the motor having a double-ended drive shaft 64 that is attached to the fans of the blowers. The unitary blower assembly comprised of the base plate, the blowers and the motor can be installed or removed as a unit. The base plate is equipped with bolt holes for mounting the blower assembly within the enclosure. When correctly positioned within the interior of the enclosure, the holes in the base plate receive lug bolts 66 projecting inwardly from the outlet plate 28. Gasket material 66 is preferably applied to the engagement side of the base plate to ensure an air tight seal. Nuts are threaded onto the lugs and tightened down, the tightening of the nuts compressing the gasket material between the base plate and the outlet plate and simultaneously firmly mounting the blower assembly in place. In the arrangement illustrated, a stabilizing support bracket 68 extends between the base plate and sides of the motor.

Two air streams are generated when the motor is actuated and the blower fans rotate—a supply air stream developed by blower 58 and an exhaust air stream developed by blower 60.

Figure 7:
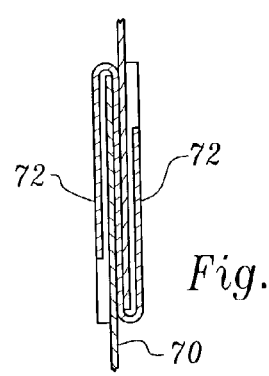
FIG. 7 is a greatly enlarged, cross-sectional view taken along the line 7—7 in FIG. 6.
Figure 8:
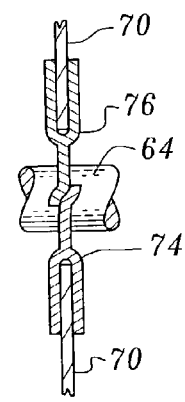
FIG. 8 is a greatly enlarged, cross-sectional view taken along the line 8—8 in FIG. 4.

The apparatus incorporates structure which maintains a separation between these two air streams. This function is accomplished by use of a removable air separator or splitter plate 70. The plate is grasped or held on three different sides by "S-clips" 72 (see FIG. 7) associated with the enclosure. At the upper end of the separator plate 70 a slot 74 is formed and extends inwardly from the upper edge of the plate. A resilient air seal 76 having an elongated slit formed therein occupies slot 74. When the splitter or separator plate 70 is in position and extends between the inlet plate and the outlet plate, slot 74 accommodates one of the projecting portions of drive shaft 64, the plate 70 being located between the motor 62 and blower 60. The seal may suitably be formed by foam rubber.

Located within enclosure 22 and connected thereto are filter racks 78, 80 which define vertical channels for receiving, respectively, air filter 82 and air filter 84. Air filter 82 is for filtering the fresh supply air and is preferably a permanent electro-static filter employed to catch and hold dust, pollen and other air borne contaminates, preventing them from being introduced into the home. Such filters are washable and would normally last for the lifetime of the unit.

The exhaust air stream is interrupted by a regular, conventional fiberglass furnace air filter which would be replaced on a regular basis by the homeowner. The principal air borne contaminates that would be filtered out by the exhaust air filter 84 would include, for example, emulsified body oils from bathing areas and clothes lint drawn from utility rooms. The unit is not meant for direct venting of clothes dryer exhaust; however, atmospheric lint is high in the air of utility rooms and it is desirable to remove that lint from the air stream prior to the air stream coming in contact with the blower motor.

Enclosure 22 further includes a bottom access plate 86 which mounts to L-brackets affixed to the inside circumference of the enclosure. Removal of the access plate allows removal and replacement of both the plate 70 and the blower assembly. The access plate includes a closure in the form of a hinged door 88 which is disposed below the filters 82, 84. The door is normally held closed by latches, but may readily be opened to provide manual access to the filters.

When installed, the bottom of apparatus 14 normally extends one half inch or so below the bottom of the ceiling truss chord or other frame support. The bottom of the enclosure will be surrounded by sheet rock. After texturing and painting of the surrounding sheet rock, a standard return air filter grill may be utilized to hide the access plate from view.

Upon operation of the system, fresh supply air and stale exhaust air are drawn through the enclosure and through ducts 16, 18 and directed to the heat exchanger 10. After passage through the heat exchanger, the exhaust air exits the house through exhaust eave plenum and duct 90. The fresh supply air, on the other hand, is directed to fresh air can 92 for distribution by ductwork into the house interior.

The invention claimed is:

1. A heat recovery ventilation system comprising, in combination:

a heat exchanger; and apparatus for causing air flow of fresh supply air and exhaust air to the heat exchanger to employ the exhaust air to either pre-heat or pre-cool the fresh supply air, said apparatus being of modular construction, spaced from the heat exchanger and comprising an enclosure defining an enclosure interior, said enclosure including an inlet portion having a supply air inlet opening and an exhaust air inlet opening and further including an outlet portion having a supply air outlet opening and an exhaust air outlet opening; a blower assembly; and connector structure releasably connecting said blower assembly to said enclosure with said blower assembly disposed in said enclosure interior, the blower assembly being in fluid flow communication with each of said supply air inlet opening, said exhaust air inlet opening, said supply air outlet opening, said exhaust air outlet opening and said housing interior whereby air flow of fresh supply air caused by said blower assembly passes seriatim through said supply air inlet opening, said housing interior and said supply air outlet opening and is delivered to said heat exchanger and whereby air flow of exhaust air caused by said blower assembly passes seriatim through said exhaust air inlet opening, said housing interior and said exhaust air outlet opening and is delivered to said heat exchanger to employ said exhaust air to either pre-heat or pre-cool said fresh air at said heat exchanger, said inlet portion comprising an inlet plate and said outlet portion comprising an outlet plate spaced from said inlet plate, said enclosure additionally comprising a shell having a shell top and two spaced shell sides connected to and extending between said outlet plate and said inlet plate and an access plate disposed under said shell top and extending between said inlet plate, said outlet plate and said shell sides, said access plate being selectively movable relative to the remainder of said enclosure to allow manual access to the enclosure interior from under said enclosure for removal and replacement of said blower assembly.

2. The heat recovery ventilation system according to claim 1 additionally comprising a filter holder disposed above the access plate for holding at least one air filter in a generally vertical orientation within said enclosure interior between said inlet plate and said outlet plate.

3. The heat recovery ventilation system according to claim 2 wherein said filter holder is sized and configured to hold at least two air filters.

4. The heat recovery ventilation system according to claim 2 wherein said access plate includes a closure selectively movable relative to the remainder of said access plate between an open position allowing manual access through said access plate to an air filter held by said filter holder and a closed position.

5. The heat recovery ventilation system according to claim 4 additionally comprising latch means for maintaining said closure in closed position.

6. A heat recovery ventilation system comprising, in combination:
a heat exchanger; and
apparatus for causing air flow of fresh supply air and exhaust air to the heat exchanger to employ the exhaust air to either pre-heat or pre-cool the fresh supply air, said apparatus being of modular construction, spaced from the heat exchanger and comprising an enclosure defining an enclosure interior, said enclosure including an inlet portion having a supply air inlet opening and an exhaust air inlet opening and further including an outlet portion having a supply air outlet opening and an exhaust air outlet opening; a blower assembly; and connector structure releasably connecting said blower assembly to said enclosure with said blower assembly disposed in said enclosure interior, the blower assembly being in fluid flow communication with each of said supply air inlet opening, said exhaust air inlet opening, said supply air outlet opening, said exhaust air outlet opening and said housing interior whereby air flow of fresh supply air caused by said blower assembly passes seriatim through said supply air inlet opening, said housing interior and said supply air outlet opening and is delivered to said heat exchanger and whereby air flow of exhaust air caused by said blower assembly passes seriatim through said exhaust air inlet opening, said housing interior and said exhaust air outlet opening and is delivered to said heat exchanger to either pre-heat or pre-cool said fresh supply air at said heat exchanger, said blower assembly including a first blower having a first blower fan and a second blower having a second blower fan, said first blower causing air flow of supply air seriatim through said supply air inlet opening, said housing interior and said supply air outlet opening to said heat exchanger and said second blower causing air flow of exhaust air seriatim through said exhaust air inlet opening, said housing interior and said exhaust air outlet opening to said heat exchanger, said blower assembly including a base plate and a motor, said first blower, said second blower and said motor being secured to said base plate, said inlet portion comprising an inlet plate and said outlet portion comprising an outlet plate, said base plate connector structure releasably connecting said base plate with the first and second blowers and motor secured thereto to said outlet plate.

7. The heat recovery ventilation system according to claim 6 wherein said connector structure comprises a plurality of threaded connectors.

8. The heat recovery ventilation system according to claim 6 wherein said base plate is connected to said outlet plate with said first blower having a portion thereof extending through said supply air outlet opening and said second blower having a portion thereof extending through said exhaust air outlet opening.

9. A heat recovery ventilation system comprising, in combination:
a heat exchanger; and
apparatus for causing air flow of fresh supply air and exhaust air to the heat exchanger to employ the exhaust air to either pre-heat or pre-cool the fresh supply air, said apparatus being of modular construction, spaced from the heat exchanger and comprising an enclosure defining an enclosure interior, said enclosure including an inlet portion having a supply air inlet opening and an exhaust air inlet opening and further including an outlet portion having a supply air outlet opening and an exhaust air outlet opening; a blower assembly; and connector structure releasably connecting said blower assembly; and connector structure releasably connecting said blower assembly to said enclosure with said blower assembly disposed in said enclosure interior, the blower assembly being in fluid flow communication with each of said supply air inlet opening, said exhaust air inlet opening, said supply air outlet opening, said exhaust air outlet opening and said housing interior whereby air flow of fresh supply air caused by said blower assembly passes seriatim through said supply air inlet opening, said housing interior and said supply air outlet opening and is delivered to said heat exchanger and whereby air flow of exhaust air caused by said blower assembly passes seriatim through said exhaust air inlet opening, said housing interior and said exhaust air outlet opening and is delivered to said heat exchanger to either pre-heat or pre-cool said fresh supply air at said heat exchanger, said blower assembly including a first blower having a first blower fan and a second blower having a second blower fan, said first blower causing air flow of supply air seriatim through said supply air inlet opening, said housing interior and said supply air outlet opening to said heat exchanger and said second blower causing air flow of exhaust air seriatim through said exhaust air inlet opening, said housing interior and said exhaust air outlet opening to said heat exchanger; and
an air separator plate disposed between said first blower and said second blower within said enclosure interior to maintain the air flow caused by said first blower and said second blower separated within the enclosure interior, a motor positioned between said first blower and said second blower and incorporating a drive shaft for rotating both said first blower fan and said second blower fan, said air separator plate being located between said motor and one of said first and second blowers and extending substantially completely between said inlet portion and said outlet portion, said air separator plate defining an opening accommodating said drive shaft, the opening defined by said air separator plate comprising a slot extending inwardly from an edge of the air separator plate, said apparatus further including a resilient air seal attached to said air separator plate and projecting into said slot for accommodating and engaging said drive shaft and substantially surrounding said air shaft to restrict air flow through said slot.

10. A heat recovery ventilation system comprising, in combination:

a heat exchanger; and apparatus for causing air flow of fresh supply air and exhaust air to the heat exchanger to employ the exhaust air to either pre-heat or pre-cool the fresh supply air, said apparatus being of modular construction, spaced from the heat exchanger and comprising an enclosure defining an enclosure interior, said enclosure including an inlet portion having a supply air inlet opening and an exhaust air inlet opening and further including an outlet portion having a supply air outlet opening and an exhaust air outlet opening; a blower assembly; and connector structure releasably connecting said blower assembly to said enclosure with said blower assembly disposed in said enclosure interior, the blower assembly being in fluid flow communication with each of said supply air inlet opening, said exhaust air inlet opening, said supply air outlet opening, said exhaust air outlet opening and said housing interior whereby air flow of fresh supply air caused by said blower assembly passes seriatim through said supply air inlet opening, said housing interior and said supply air outlet opening and is delivered to said heat exchanger and whereby air flow of exhaust air caused by said blower assembly passes seriatim through said exhaust air inlet opening, said housing interior and said exhaust air outlet opening and is delivered to said heat exchanger to either pre-heat or pre-cool said fresh supply air at said heat exchanger, said blower assembly including a first blower having a first blower fan and a second blower having a second blower fan, said first blower causing air flow of supply air seriatim through said supply air inlet opening, said housing interior and said supply air outlet opening to said heat exchanger and said second blower causing air flow of exhaust air seriatim through said exhaust air inlet opening, said housing interior and said exhaust air outlet opening to said heat exchanger, an air separator plate disposed between said first blower and said second blower within said enclosure interior to maintain the air flow caused by said first blower and said second blower separated within the enclosure interior, and an air filter holder and first and second air filters held by said air filter holder, said first air filter being disposed on one side of said air separator plate to filter supply air passing between said supply air inlet opening and said supply air outlet opening and said second air filter being disposed on the other side of said air separator plate to filter air passing between said exhaust air inlet opening and said exhaust outlet opening.

11. The heat recovery ventilation system according to claim 10 wherein said first air filter is an electro-static filter and wherein said second air filter is a fiberglass air filter.

* * * * *